United States Patent [19]
Murphy

[11] Patent Number: 5,313,916
[45] Date of Patent: May 24, 1994

[54] ROCKER ARM ASSEMBLY

[75] Inventor: Richard F. Murphy, Torrington, Conn.

[73] Assignee: The Torrington Company, Torrington, Conn.

[21] Appl. No.: 100,589

[22] Filed: Jul. 30, 1993

[51] Int. Cl.$^5$ .............................................. F01L 1/18
[52] U.S. Cl. ........................... 123/90.39; 123/90.41; 74/519; 74/559; 384/612
[58] Field of Search ............... 123/90.39, 90.41, 90.42; 74/519, 559; 384/612

[56] References Cited

U.S. PATENT DOCUMENTS

| Re. 33,870 | 4/1992 | Fittro et al. | 123/90.410 |
|---|---|---|---|
| 3,251,350 | 5/1966 | Thompson | 123/90.41 |
| 3,466,073 | 9/1969 | Pohle | 123/90.39 |
| 3,621,823 | 11/1971 | Lombardi | 123/90.42 |
| 4,314,732 | 2/1982 | Murphy | 123/90.41 |
| 4,577,911 | 3/1986 | Fredericksen et al. | 308/2 R |
| 4,674,453 | 6/1987 | Dove, Jr. | 123/90.39 |
| 4,697,473 | 10/1987 | Patel | 123/90.39 |
| 4,718,379 | 1/1988 | Clark | 123/90.39 |
| 4,724,802 | 2/1988 | Ishii | 123/90.39 |
| 4,727,832 | 3/1988 | Miyamura et al. | 123/90.39 |
| 4,858,575 | 8/1989 | Fittro et al. | 123/90.41 |
| 4,878,463 | 11/1989 | Fredericksen et al. | 123/90.41 |
| 4,896,635 | 1/1990 | Willermet et al. | 123/90.41 |
| 4,944,257 | 7/1990 | Mills | 123/90.39 |
| 4,967,705 | 11/1990 | Maciag et al. | 123/90.48 |
| 5,074,261 | 12/1991 | Hamburg et al. | 123/90.39 |
| 5,190,000 | 3/1993 | van Schaik et al. | 123/90.39 |
| 5,195,475 | 3/1993 | Murphy et al. | 123/90.39 |
| 5,211,143 | 5/1993 | Fontichiaro et al. | 123/90.39 |
| 5,241,928 | 9/1993 | Hamada et al. | 123/90.39 |

Primary Examiner—E. Rollins Cross
Assistant Examiner—Weilun Lo
Attorney, Agent, or Firm—John C. Bigler

[57] ABSTRACT

Two support arms of a bearing support member extend in opposite directions, each support arm having an overlying bearing cup engageable with the rocker arm. Rolling members within an annulus formed between the bearing support member and the bearing cups provide free rotary oscillation of the rocker arm with respect to the bearing support member. At least one support arm has a crowned surface such that radial load is distributed along the length of the rolling members when misalignment of elements of the rocker arm assembly occurs. A bearing assembly for mounting within a rocker arm is also disclosed.

18 Claims, 4 Drawing Sheets

ROCKER ARM ASSEMBLY

BACKGROUND OF THE INVENTION

This invention relates generally to valve operating mechanisms for use in internal combustion engines and, more particularly, to an oscillating rocker arm assembly and subassembly having rolling members.

Typically, a rocker arm assembly with rolling members is supported on a support shaft mounted perpendicularly on a support stud extending from the head of the engine. The rocker arm is pivoted on the support shaft, which serves as an inner raceway, by means of drawn cup needle roller bearings mounted on the rocker arm. Alternatively, a bearing sleeve may be mounted on the support shaft to provide the inner raceway, permitting use of a noncylindrical support arm and facilitating the use of powder metal forming.

Because of inherent manufacturing variations and deflections that occur during rocker arm operation, it is difficult to obtain even loading along the length of the rolling members with present rocker arm assemblies. Misalignment of rocker arm assembly elements causes the rolling members to carry a disproportionate radial load at one end, shortening the service life of the rocker arm assembly. Accordingly, there is a need to provide a rocker arm assembly that effects a more even distribution of radial load along the length of the rolling members when such misalignment occurs.

The foregoing illustrates limitations known to exist in present rocker arm bearing assemblies. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a rocker arm assembly comprising a rocker arm and a bearing support member, mountable about a stud means. Two support arms of the bearing support member extend in opposite directions, each support arm having an overlying bearing cup engageable with the rocker arm. Rolling members within an annulus formed between the bearing support member and the bearing cups provide free rotary oscillation of the rocker arm with respect to the bearing support member. At least one support arm has a crowned surface such that radial load is distributed along the length of the rolling members when misalignment of elements of the rocker arm assembly occurs.

In another aspect of the present invention, this is accomplished by providing a bearing assembly for mounting within a rocker arm.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
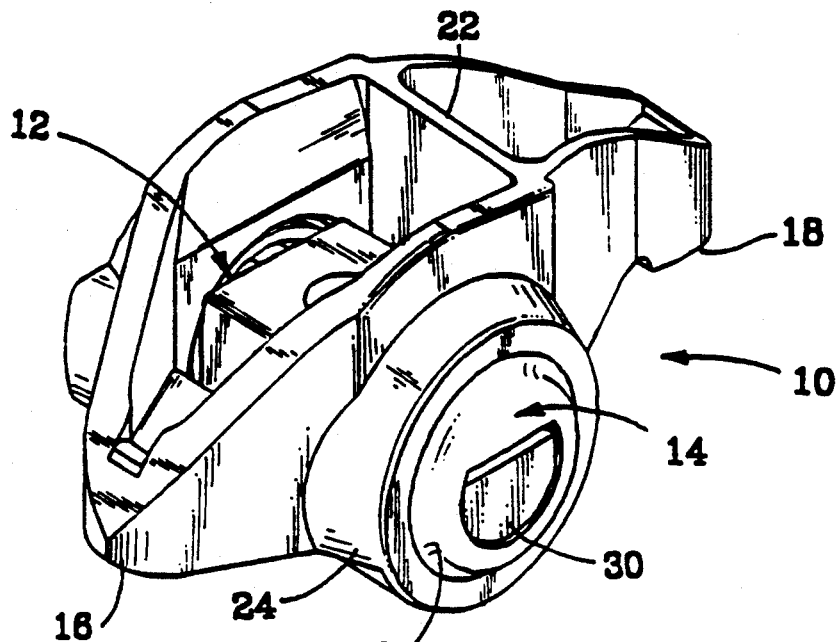
FIG. 1 is a pictorial view illustrating a first embodiment of the rocker arm assembly of the present invention.

Referring now to the drawings, FIG. 1 illustrates a first embodiment of the present invention having rocker arm 10 supported on bearing support member 12 by roller bearings 14 to form a rocker arm assembly as would be used in an internal combustion engine.

Rocker arm 10 has first end 16 for engagement with a push rod, not shown, and second end 18 for engagement with a valve stem of a poppet valve, not shown. The rocker arm assembly is mounted on the engine by a stud, cap screw or other stud means 20, indicated in phantom in FIG. 2. In the embodiment shown, rocker arm 10 is of a cast configuration including reinforcing web 22 and flanges 24, providing added rigidity. However, the rocker arm assembly of the present invention may be employed with stamped or cast rocker arms of various configurations.

Figure 2:
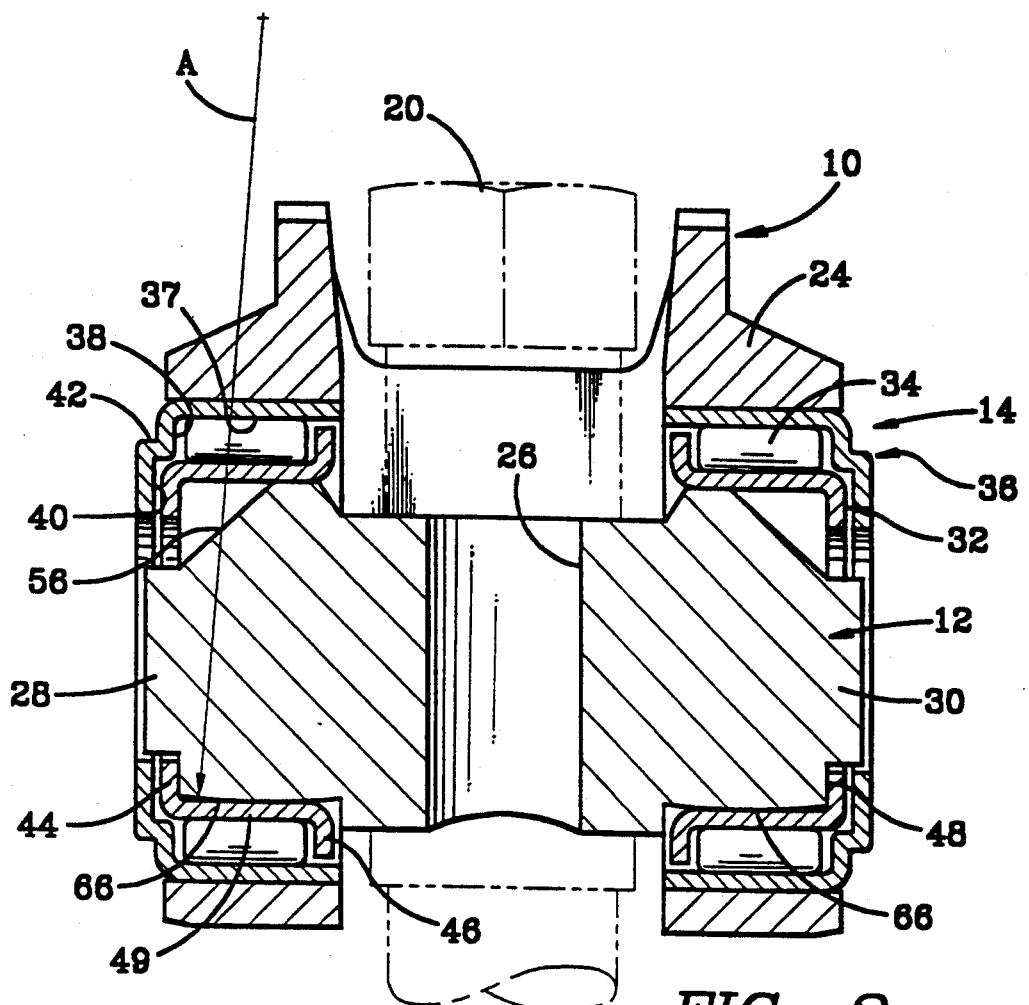
FIG. 2 is an enlarged cross sectional view of the rocker arm assembly of FIG. 1.

As illustrated in FIG. 2, bearing support member 12 has a substantially vertical bore 26 for receiving stud means 20 to mount the rocker arm assembly. Bearing support member 12 has support arms 28 and 30 which extend in opposite directions along a common axis perpendicular to stud means 20. Roller bearings 14 are mounted along that axis over support arms 28 and 30 by inner bearing sleeves 32 which provide inner raceways for rolling members 34. Roller bearings 14 may employ a full complement of needle rollers, as illustrated, or may employ other types of rolling members 34, with or without retainers.

Rolling members 34 are within an annulus formed between inner sleeves 32 and bearing cups 36. Bearing cups 36 have a common axis and are rigidly mounted on two spaced apart side portions of rocker arm 10 by any of various fixing means. In the embodiment shown, for example, apertures in the side portions provide an interference fit with bearing cups 36. Support member 12 has a cross-section smaller than the apertures in the side portions of rocker arm 10, thus allowing support member 12 to be inserted through one of the apertures during assembly.

Bearing cups 36 are of the "open" type. That is, the bearing cups have a bottom surface, cylindrical side surfaces 37, and an open top. As disclosed in Applicant's co-pending application, Ser. No. 08/085572, the bottom surface is "stepped", that is, a radially inwardly extending first portion 38 and a radially inwardly extending second portion 40 axially offset from first portion 38. First portion 38 is engageable with ends of rolling members 34 to limit outward axial movement of the rolling members, and second portion 40 is engageable with a stop surface (described below) to limit axial movement of rocker arm 10 with respect to support member 12.

In this preferred embodiment, bearing cups 36 are formed by a convenient draw process such that first portion 38 and second portion 40 are radial surfaces, i.e., perpendicular to the axis of bearing cups 36, and are connected by cylindrical portion 42. However, other configurations of the stepped bottom surface of bearing cups 36 are anticipated by the present invention. For example, portions 38 and 40 may be curved or angled with respect to the axis of roller bearings 14 and may be connected by a conical or curved portion providing the desired axial offset of bottom portions 38 and 40.

Bearing sleeves 32 are formed with outwardly extending flanges 46 that are engageable with ends of rolling members 34 to limit axial movement toward stud means 20. Inwardly extending flanges 44 abut recessed end surfaces 48 of support arms 28 and 30 to ensure proper axial location of inwardly extending flanges 44. A cylindrical portion of bearing sleeves 32 provides an inner raceway for rolling members 34 and facilitates use of powder metal forming of support member 12 by allowing support arms 28 and 30 to have a noncylindrical configuration, as described below.

In this first embodiment, inwardly extending flanges 44 provide the stop surfaces (described above) engaged by bearing cup second portion 40 to limit axial movement of rocker arm 10 with respect to support member 12. However, bearing cup portions 40 may engage end surfaces of support arms 28 and 30 directly, with similar effect. Bearing sleeves 32 are considered optional in practicing the present invention. That is, many of the advantages of the present invention may be realized without bearing sleeves 32.

The configuration of bearing sleeves 32 with both inwardly and outwardly extending flanges eliminates a bottom coining station in the sleeve tooling compared to the tooling required for forming more traditional bearing sleeves with a single outward flange. Similarly, problems involving sleeve bulging on a coined single lip sleeve during forming are eliminated. As a result, the illustrated bearing sleeves are significantly easier and less expensive to manufacture than traditional bearing sleeves.

Figure 3:
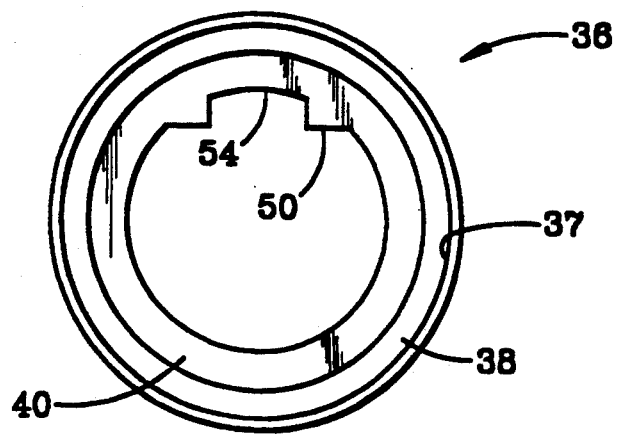
FIG. 3 is an end view of the bearing cup of the rocker arm assembly of FIG. 1.

As shown in FIGS. 1 and 3, second portion 40 of bearing cups 36 may have a modified D-shaped opening or other keyway means 50 for receiving D-shaped end or other key means 52 of support member 12. The purpose of keyway means 50 and key means 52 is to ensure that the bearing support member 28 is assembled into rocker arm 10 with the proper orientation, that is, that bearing support member 12 is not inadvertently "upside down". During assembly, bearing support member 12 with bearings 14 can be conveniently inserted into rocker arm 10 by a machine that uniformly positions keyway means 50 with respect to rocker arm 12.

Figure 4:
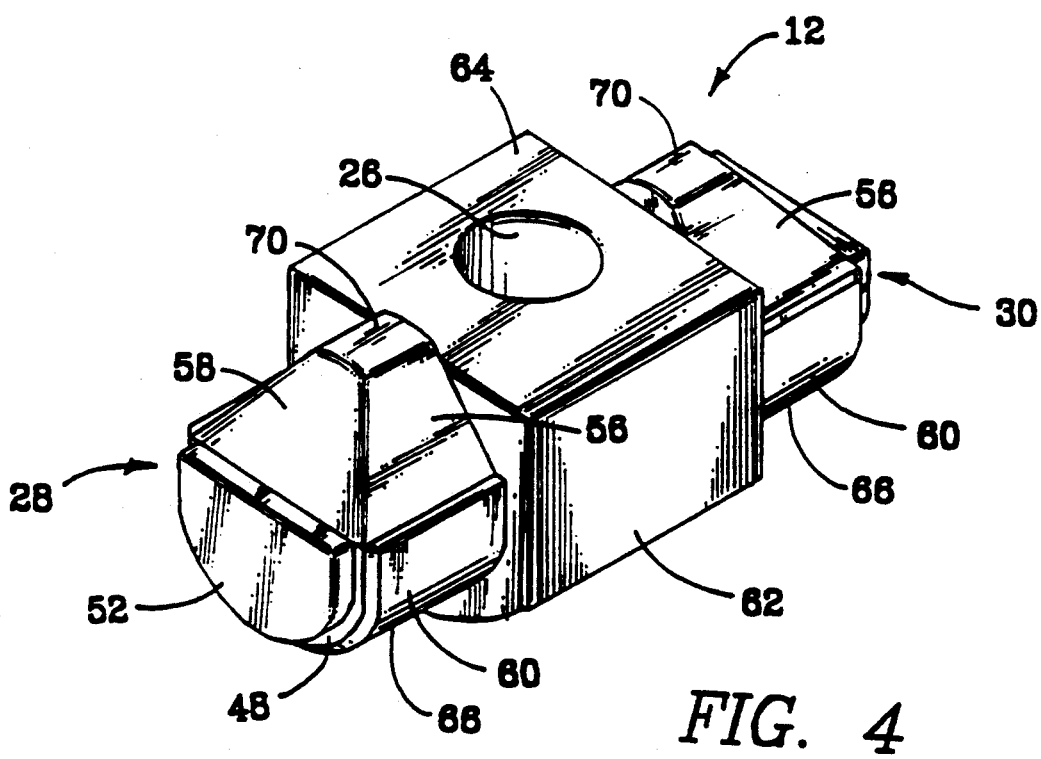
FIG. 4 is a pictorial view of the bearing support member of the rocker arm assembly of FIG. 1.

Bearing support member 12 may include beveled surfaces 56 and 58 and flat side surfaces 60 and 62, as shown in FIG. 4. Those beveled and flat surfaces facilitate manufacture of bearing support member 12 by powder metal forming, as described in U.S. Pat. No. 5,074,261, of which Applicant is a co-inventor. Because rolling members 34 ride on an inner raceway provided by inner sleeves 32, and because the greatest force is on the lower portion of roller bearings 14, those beveled and flat surfaces on the top and side portions of bearing support member 12 do not affect operation of the rocker arm assembly.

Bearing support member 12 and roller bearings 14 may form a subassembly having a generally cylindrical configuration. Because central portion 64 of bearing support member 12 has a smaller cross-section (smaller overall diameter) than that of bearing cups 36, the subassembly may be inserted laterally into the apertures of the side portions of rocker arm 10 while bearing cups 36 being are press-fit therein. Alternatively, bearing cups 36 may be inserted from opposite sides of rocker arm 10.

In the present invention, a crown 66 is formed on the lower surface of support arms 28 and 30. Crown 66 may have a wide variety of configurations having a curved, convex surface. For example, crown 66 may protrude radially outwardly as a rounded surface beyond the cylindrical outline 68, indicated in FIG. 5, corresponding to a typical support surface matching the inner diameter of inner sleeves 32. As illustrated in FIG. 2, crown 66 of the first embodiment has an arcuate outline in longitudinal section, the defined arc having a radius A, the curve being exaggerated somewhat for clarity of explanation.

Figure 5:
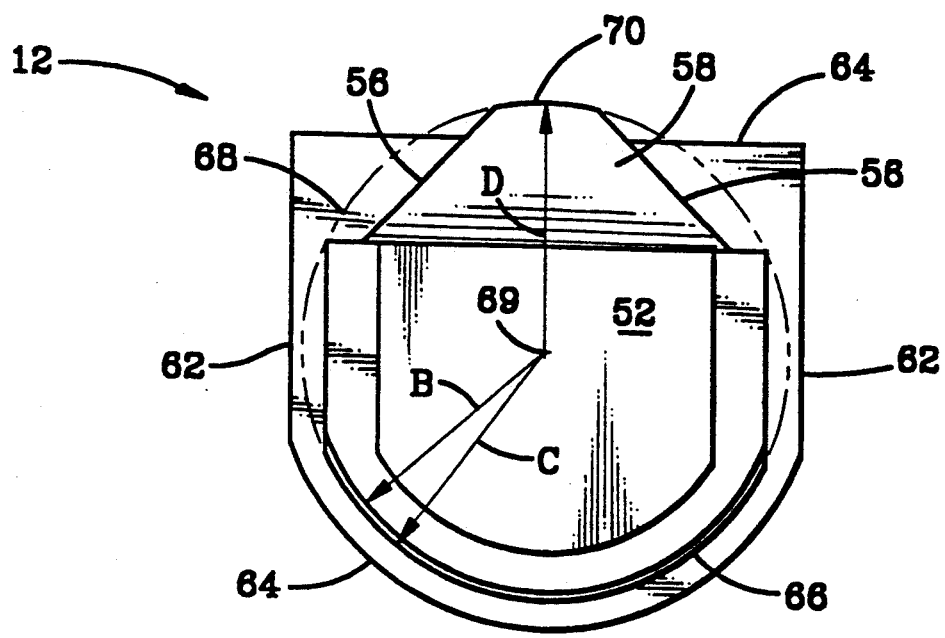
FIG. 5 is an enlarged end view of the bearing support member of the rocker arm assembly of FIG. 1.

As illustrated in FIG. 5, crown 66 has an arcuate outline in transverse section, extending radially outwardly from the axis 69 of cylindrical outline 68 from a minimum radius B, at the end of support arms 28 and 30 to a maximum radius C (and back to the minimum radius B as indicated in FIG. 2). This configuration is referred to herein as a "barrel" configuration. In one particular example of this configuration, radius B is the same or slightly larger than radius D, the radius from upper surface 70 of support arms 28 and 30, and radius A is approximately 30 times greater than radius D.

It should be appreciated that the relative dimensions of these defined radii will depend on the particular application involved. The curve of crown 66 is selected to correspond to the amount of misalignment anticipated, a smaller radius A facilitating a larger angle of misalignment. Depending on the type of rocker arm assembly, the angle of misalignment will vary with the length of inner sleeves 32 and the dimensional tolerances of the various elements of the rocker arm assembly.

The location of crown 66 on the lower surface of support arms 28 and 30 ensures that it is in the area of the support arms of greatest load. In operation, the push rod and valve stem apply an upward force on first end 16 and second end 18, respectively, of rocker arm 10, acting through rolling members 34 on the support arms, and stud means 20 applies a corresponding downward force on central portion 64 of bearing support member 12. Beveled surfaces 56 and 58 and flat surfaces 60, relief areas facilitating tooling, and upper surface 70 support little of the load.

The barrel configuration of crown 66 on the lower surface of support arms 28 and 30 allow inner sleeves 32 to adjust slightly to misalignment between bearing support member 12 and other elements of the rocker arm assembly, such as bearing cups 36 and rocker arm 10, and more easily carry the radial load along their length. Inner sleeves 32 also deflect slightly under such conditions and help keep rolling members 34 from carrying a disproportionate radial load at one end.

The particular advantages of crown 66 of the present invention are not limited to a rocker arm assembly having a support arm and roller bearings pressed into a transverse bore of a rocker arm. In addition, for example, crown 66 could also be added to a "drop in" type rocker arm assembly as described in U.S. Pat. No. Re. 33,870. Such rocker arm assembly, defining a second embodiment of the present invention, is illustrated in FIGS. 6 and 7, in relation to stud means 81, indicated in phantom.

In this embodiment, rocker arm 82 has lower portion 84 and side walls 86 extending upward therefrom. T-shaped bearing support member 88 with inner sleeves 90, rolling members 92, and bearing cups 94 is inserted downwardly (hence, the term "drop in") as a subassembly into rocker arm 82 such that support member 88 extends into elongated apertures 96. As indicated in FIG. 7, bearing support member 88 has relief areas and a cylindrical upper surface similar to those of bearing support member 12 shown in FIG. 5.

Figure 6:
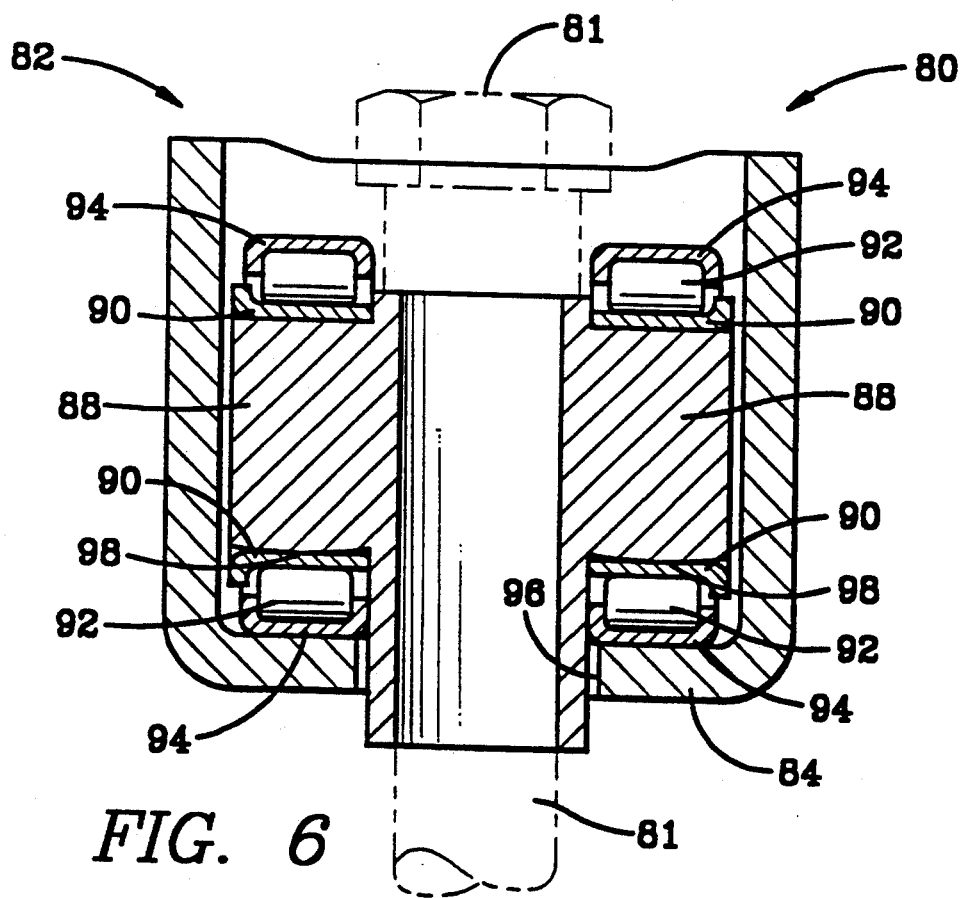
FIG. 6 is a cross sectional view illustrating a second embodiment of the rocker arm assembly of the present invention.
Figure 7:
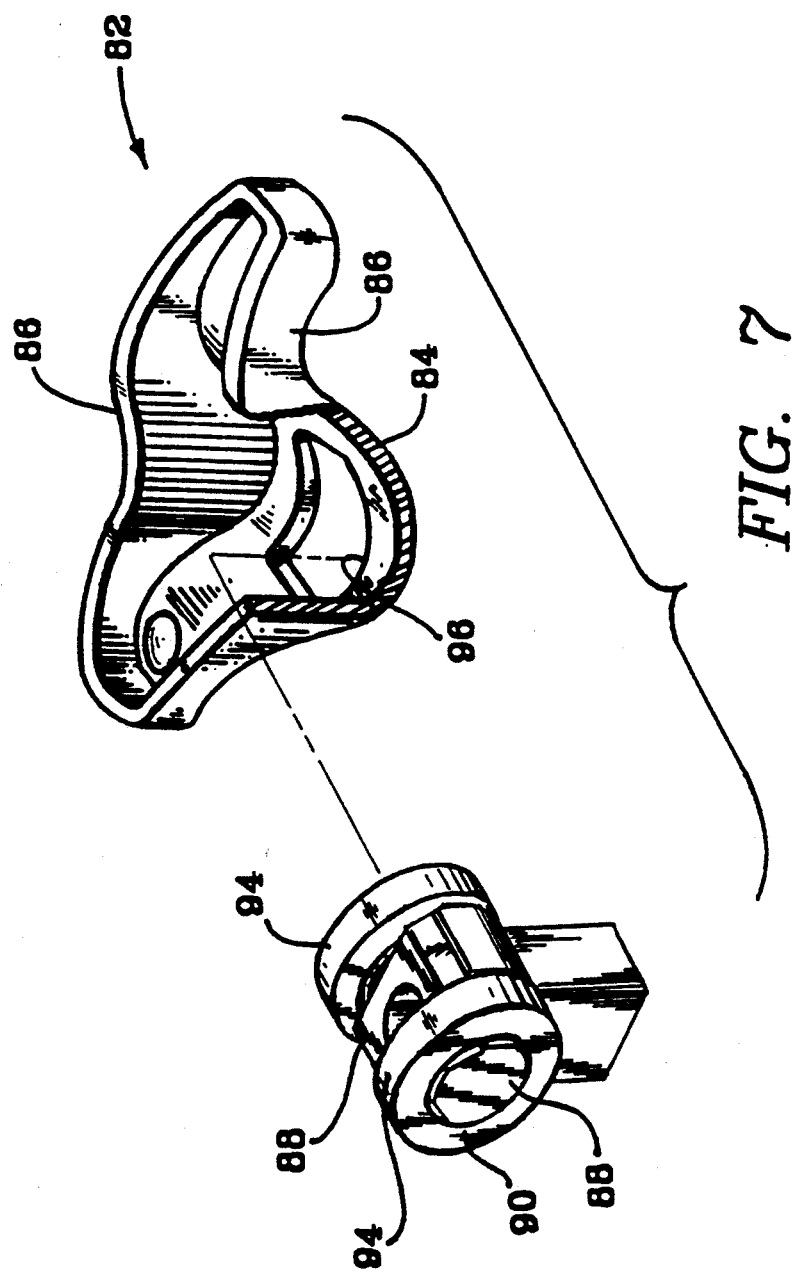
FIG. 7 is an exploded pictorial view, with a portion cut away, of the embodiment of FIG. 6 of the present invention.

As illustrated in FIG. 6, crown 98, similar to crown 66 of the first preferred embodiment, is formed on the lower surface of the support arms of bearing support member 88. As described with respect to crown 66, crown 98 has a barrel configuration. That is, crown 98 has an arcuate outline in longitudinal section as well as an arcuate outline in transverse section, progressing from a minimum radius to a maximum radius and back to a minimum radius with respect to the longitudinal axis of the support arms.

In operation, crown 98 allows inner sleeves 90 to adjust slightly to misalignment between bearing support member 88 and other elements of the rocker arm assembly, such as bearing cups 94 and rocker arm 82, and to more evenly carry the radial load along their length. Inner sleeves 90 also deflect slightly under such conditions and keep rolling members 92 from carrying a disproportionate radial load at one end. Similar advantages result in other rocker arm assembly configurations, not shown, due to the general applicability of the crowned bearing support member of the present invention.

From the above, it will be apparent that the present invention provides a more even distribution of radial load along the length of the rolling members, even when misalignment of rocker arm elements occurs. Because such misalignment is inherent, to some degree, due to manufacturing variations and deflections during rocker arm operation, the present invention provides a significant benefit in a wide variety of rocker arm assemblies.

Having described the invention, what is claimed is:

1. A rocker arm assembly for mounting about a stud means, the rocker arm assembly comprising:
   a rocker arm;
   a bearing support member having two support arms extending in opposite directions along an axis, the bearing support member being adapted for mounting about the stud means;
   two bearing cups, one bearing cup extending over each support arm and engageable with the rocker arm; and
   rolling members within an annulus formed between the bearing support member and the bearing cups such that the rocker arm is free to oscillate rotatably with respect to the bearing support member;
   at least one support arm having a curved surface wherein a distance between the curved surface and said axis increases and then decreases along a direction of said axis such that a radial load is distributed along the length of the rolling members when misalignment of elements of the rocker arm assembly occurs.

2. The rocker arm assembly according to claim 1, wherein said curved surface of the support arm has a barrel configuration such that a longitudinal section of the support arm through the curved surface includes an arcuate outline.

3. The rocker arm assembly according to claim 1, wherein a minimum distance between said curved surface and said axis is approximately the same as a distance between a diametrically opposite surface of the support arm and said axis.

4. The rocker arm assembly according to claim 2, wherein the arcuate outline of the longitudinal section of the support arm has a radius of more than 10 times a distance between a diametrically opposite surface of the support arm and said axis.

5. The rocker arm assembly according to claim 1, wherein said curved surface protrudes radially outwardly from said axis as a convex surface a distance greater than a distance between a diametrically opposite surface of the support arm and said axis.

6. The rocker arm assembly according to claim 1, wherein said curved surface of the support arm is located diametrically opposite a cylindrical surface of the support arm and is separated from the cylindrical surface by at least one recessed surface having a smaller radial dimension than said curved surface and cylindrical surface.

7. The rocker arm assembly according to claim 1, further comprising two bearing sleeves, one sleeve mounted over each support arm between the rolling members and the bearing support member, each providing an inner raceway for the rolling members.

8. The rocker arm assembly according to claim 7, wherein the inner sleeves are capable of deflecting over said curved surface of the support arm to adjust to misalignment between the bearing support member and the other elements of the rocker arm assembly to more evenly distribute the radial load along the length of the inner sleeves.

9. The rocker arm assembly according to claim 1, wherein the bearing cups are mounted within a bore of the rocker arm.

10. The rocker arm assembly according to claim 1, wherein the rocker arm has a lower portion and side walls extending upward therefrom and wherein the bearing support member is inserted downwardly during assembly to a position with the bearing cups engaging the lower portion of the rocker arm.

11. A bearing assembly for mounting about a stud means and within a rocker arm, the bearing assembly comprising:
   a bearing support member having two support arms extending in opposite directions along an axis, the bearing support member being adapted for mounting about the stud means;
   two bearing cups, one bearing cup extending over each support arm and engageable with the rocker arm; and
   rolling members within an annulus formed between the bearing support member and the bearing cups such that the rocker arm is free to oscillate rotatably with respect to the bearing support member;
   at least one support arm having a curved surface wherein a distance between the curved surface and said axis increases and then decreases along a direction of said axis such that a radial load is distributed along the length of the rolling members when misalignment of elements of the rocker arm assembly occurs.

12. The bearing assembly according to claim 11, wherein said curved surface of the support arm has a barrel configuration such that a longitudinal section of the support arm through the curved surface includes an arcuate outline.

13. The bearing assembly according to claim 11, wherein a minimum distance between said curved surface and said axis is approximately the same as a distance between a diametrically opposite surface of the support arm and said axis.

14. The bearing assembly according to claim 12, wherein the arcuate outline of the longitudinal section of the support arm has a radius of more than 10 times a distance between a diametrically opposite surface of the support arm and said axis.

15. The bearing assembly according to claim 11, wherein said curved surface protrudes radially outwardly from said axis as a convex surface a distance greater than a distance between a diametrically opposite surface of the support arm and said axis.

16. The bearing assembly according to claim 11, wherein said curved surface of the support arm is located diametrically opposite a cylindrical surface of the support arm and is separated from the cylindrical surface by at least one recessed surface having a smaller radial dimension than said curved surface and cylindrical surface.

17. The bearing assembly according to claim 11, further comprising two bearing sleeves, one sleeve mounted over each support arm between the rolling members and the bearing support member, each providing an inner raceway for the rolling members.

18. The bearing assembly according to claim 17, wherein the inner sleeves deflect over said curved surface of the support arm to adjust to misalignment between the bearing support member and the other elements of the rocker arm assembly to more evenly distribute the radial load along the length of the inner sleeves.

* * * * *